US008822602B2

(12) United States Patent
Leskinen et al.

(10) Patent No.: US 8,822,602 B2
(45) Date of Patent: Sep. 2, 2014

(54) HETEROPHASIC PROPYLENE COPOLYMERS WITH STIFFNESS/IMPACT/FLOWABILITY BALANCE

(75) Inventors: Pauli Leskinen, Helsinki (FI); Petar Doshev, Linz (AT); Cornelia Kock, Pucking (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/884,101

(22) PCT Filed: Nov. 8, 2011

(86) PCT No.: PCT/EP2011/069611
§ 371 (c)(1),
(2), (4) Date: Jun. 7, 2013

(87) PCT Pub. No.: WO2012/062734
PCT Pub. Date: May 18, 2012

(65) Prior Publication Data
US 2013/0281630 A1    Oct. 24, 2013

(30) Foreign Application Priority Data
Nov. 12, 2010 (EP) .................................... 10190988

(51) Int. Cl.
C08L 23/12 (2006.01)
C08F 10/00 (2006.01)
C08F 297/08 (2006.01)

(52) U.S. Cl.
USPC ............................ 525/199; 525/232; 525/240

(58) Field of Classification Search
CPC .... C08L 23/12; C08L 23/16; C08L 2205/025; C08L 2203/16; C08L 2205/035; C08L 2207/04; C08L 2314/00; C08F 2500/12
USPC ............... 525/199, 232, 240; 526/65, 67, 204
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,473,660 A | 9/1984 | Albizzati et al. | |
| 4,532,311 A | 7/1985 | Fulks et al. | |
| 4,543,399 A | 9/1985 | Jenkins, III et al. | |
| 4,560,671 A | 12/1985 | Gross et al. | |
| 4,578,879 A | 4/1986 | Yokoyama et al. | |
| 4,582,816 A | 4/1986 | Miro | |
| 4,621,952 A | 11/1986 | Aronson | |
| 4,803,251 A | 2/1989 | Goode et al. | |
| 4,855,370 A | 8/1989 | Chirillo et al. | |
| 4,933,149 A | 6/1990 | Rhee et al. | |
| 5,026,795 A | 6/1991 | Hogan | |
| 2010/0016510 A1* | 1/2010 | Malm et al. | 525/240 |
| 2011/0288213 A1* | 11/2011 | Bergstra et al. | 524/108 |
| 2013/0309431 A1* | 11/2013 | Bergstra et al. | 428/36.9 |

FOREIGN PATENT DOCUMENTS

| | | |
|---|---|---|
| EP | 0188125 A2 | 7/1986 |
| EP | 0250169 A2 | 12/1987 |
| EP | 0479186 A2 | 4/1992 |
| EP | 0491566 A2 | 6/1992 |
| EP | 0499759 A1 | 8/1992 |
| EP | 0560035 A1 | 9/1993 |
| EP | 0579426 A1 | 1/1994 |
| EP | 0600414 A1 | 6/1994 |
| EP | 0721798 A2 | 7/1996 |
| EP | 0887379 A1 | 12/1998 |
| EP | 0887380 A1 | 12/1998 |
| EP | 0887381 A1 | 12/1998 |
| EP | 0891990 A2 | 1/1999 |
| EP | 1415999 A1 | 5/2004 |
| EP | 1484343 A1 | 12/2004 |
| EP | 1591460 A1 | 11/2005 |

(Continued)

OTHER PUBLICATIONS

International Search Report and Written Opinion for International Application No. PCT/EP2011/069611 Filed on Nov. 8, 2011.

*Primary Examiner* — Nathan M Nutter
(74) *Attorney, Agent, or Firm* — Warn Partners, P.C.

(57) ABSTRACT

Heterophasic propylene copolymer (HECO) comprising: (a) a polypropylene matrix comprising: ($a_1$) a first propylene homopolymer fraction (PPH1) with a melt flow rate $MFR_2$ (230° C.) measured according to ISO 1133 in the range of >200 to 500 g/10 min, ($a_{2-1}$) a second propylene homopolymer fraction (PPH2) with a melt flow rate $MFR_2$ (230° C.) measured according to ISO 1133 in the range of >30 to ≤200 g/10 min or, ($a_{2-2}$) a second propylene homopolymer fraction (PPH2) with a melt flow rate $MFR_2$ (230° C.) measured according to ISO 1133 in the range of >5 to ≤30 g/10 min and, ($a_{3-1}$) a third propylene homopolymer fraction (PPH3) with a melt flow rate $MFR_2$ (230° C.) measured according to ISO 1133 in the range of 0.03 to ≤5 g/10 min, if the second propylene homopolymer fraction is fraction ($a_{2-1}$) or, ($a_{3-2}$) a third propylene homopolymer fraction (PPH3) with a melt flow rate $MFR_2$ (230° C.) measured according to ISO 1133 in the range of >30 to ≤200 g/10 min, if the second propylene homopolymer fraction is fraction ($a_{2-2}$), wherein the polypropylene matrix has a melt flow rate $MFR_2$ (230° C.) measured according to ISO 1133 in the range of 30 to 500 g/10 min and a xylene cold soluble fraction determined at 23° C. according to ISO 6427 in the range of 0.5 to <2.0 wt %, (b) an elastomeric propylene copolymer dispersed in said matrix, wherein (i) said heterophasic propylene copolymer has a melt flow rate $MFR_2$ (230° C.) measured according to ISO 1133 in the range of 25 to 200 g/10 min and, (ii) as the amorphous phase (AM) of the cold soluble fraction (XCS) of the heterophasic propylene copolymer has an intrinsic viscosity measured according to ISO 1628-1 (at 135° C. in tetraline) of ≥2.0 dl/g, and a process for its preparation.

8 Claims, No Drawings

(56) References Cited

FOREIGN PATENT DOCUMENTS

| | | |
|---|---|---|
| EP | 1860125 A1 | 11/2007 |
| EP | 1935938 A1 | 6/2008 |
| EP | 2174980 A1 | 4/2010 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9219659 A1 | 11/1992 |
| WO | 9221705 A | 12/1992 |
| WO | 9311165 A1 | 6/1993 |
| WO | 9311166 A1 | 6/1993 |
| WO | 9319100 A1 | 9/1993 |
| WO | 9425495 A1 | 11/1994 |
| WO | 9425497 A1 | 11/1994 |
| WO | 9428032 A1 | 12/1994 |
| WO | 9517952 A1 | 7/1995 |
| WO | 9704015 A1 | 2/1997 |
| WO | 9736939 A1 | 10/1997 |
| WO | 9812234 A1 | 3/1998 |
| WO | 9858977 A1 | 12/1998 |
| WO | 9933842 A1 | 7/1999 |
| WO | 0026258 A1 | 5/2000 |
| WO | 0029452 A1 | 5/2000 |
| WO | 0105845 A1 | 1/2001 |
| WO | 03000754 A1 | 1/2003 |
| WO | 03000756 A1 | 1/2003 |
| WO | 03000757 A1 | 1/2003 |
| WO | 04000899 A1 | 12/2003 |
| WO | 2004029112 A1 | 4/2004 |
| WO | 2004111095 A1 | 12/2004 |
| WO | 2005087361 A1 | 9/2005 |
| WO | 2006022736 A1 | 3/2006 |
| WO | 2006120187 A1 | 11/2006 |
| WO | 2007025640 A1 | 3/2007 |

* cited by examiner

HETEROPHASIC PROPYLENE COPOLYMERS WITH STIFFNESS/IMPACT/FLOWABILITY BALANCE

CROSS REFERENCE TO RELATED APPLICATIONS

This application is a National Stage of International Application No. PCT/EP2011/069611, filed Nov. 8, 2011. This application claims priority to European Patent Application No. 10190988.5 filed Nov. 12, 2010. The disclosures of the above applications are incorporated herein by reference.

The present invention relates to heterophasic propylene copolymers with improved stiffness/impact/flowability balances, which are suitable for injection moulding applications, preferably for thin-walled packaging. Furthermore, the present invention relates to a process for the production of such heterophasic propylene copolymers, as well as to their use.

Heterophasic propylene copolymers are well known in the art. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or scanning force microscopy.

High flow (high melt flow index) heterophasic propylene copolymers (HECO) find their application, inter alia, in injection moulding and especially in thin wall packaging segment.

Thus, polypropylenes of high fluidity, i.e. of a melt flow index higher than 25 g/10 min in accordance with ISO 1133 (230° C., 2.16 kg load), are employed for the production of articles with very thin walls, high flow length/thickness ratios and complex geometries.

Melt flow provides an indication of the polymer resin's processability, such as in extrusion or moulding, where it is necessary to soften or melt the polymer resin.

However, especially in the thin wall packaging market segment there is an ongoing trend to down-gauge and lighter articles, since these features lead to savings in terms of money, material and energy.

To down-gauge and produce lighter articles there is an increasing need for stiffer material with good impact properties. Higher stiffness allows articles to be manufactured with thinner walls and hence allows less raw materials to be used per article than for less stiff articles. Thinner walls mean lighter articles and hence lower transport costs. Lighter articles also mean a reduction in cycle time of an injection moulding process which is also of great importance.

Thus there is an incessant market demand for improvement of the stiffness/impact/flowability balance of such heterophasic propylene copolymers, being suitable in injection moulding applications, like thin-wall packaging applications, especially for the production of food packaging.

Achievement of such an improved property profile would allow for cycle time reduction and production of articles with reduced wall thickness (down-gauging and light-weighing).

It was therefore an object of the invention to provide heterophasic propylene copolymers with high melt flow rate and stiffness, simultaneously having good impact performance, even at low temperature.

The present invention resides in the finding that such a beneficial property profile regarding stiffness/impact/flowability balance can be achieved with a heterophasic propylene copolymer comprising a polypropylene matrix with a high melt flow rate $MFR_2$ (230° C.) and additionally a xylene cold soluble (XCS) fraction as low as possible, the matrix comprising three propylene homopolymer fractions which differ in the melt flow rate $MFR_2$ (230° C.).

Therefore the present invention is directed to a heterophasic propylene copolymer (HECO) comprising
(a) a polypropylene matrix comprising
  ($a_1$) a first propylene homopolymer fraction (PPH1) with a melt flow rate $MFR_2$ (230° C.) measured according to ISO 1133 in the range of 200 to 500 g/10 min
  ($a_{2\text{-}1}$) a second propylene homopolymer fraction (PPH2) with a melt flow rate $MFR_2$ (230° C.) measured according to ISO 1133 in the range of 30 to <200 g/10 min or
  ($a_{2\text{-}2}$) a second propylene homopolymer fraction (PPH2) with a melt flow rate $MFR_2$ (230° C.) measured according to ISO 1133 in the range of 5 to <30 g/10 min and
  ($a_{3\text{-}1}$) a third propylene homopolymer fraction (PPH3) with a melt flow rate $MFR_2$ (230° C.) measured according to ISO 1133 in the range of 0.03 to 5 g/10 min, if the second propylene homopolymer fraction is fraction ($a_{2\text{-}1}$) or
  ($a_{3\text{-}2}$) a third propylene homopolymer fraction (PPH3) with a melt flow rate $MFR_2$ (230° C.) measured according to ISO 1133 in the range of 30 to <200 g/10 min, if the second propylene homopolymer fraction is fraction ($a_{2\text{-}2}$),
  wherein the polypropylene matrix has a melt flow rate $MFR_2$ (230° C.) measured according to ISO 1133 in the range of 30 to 500 g/10 min and a xylene cold soluble fraction determined at 23° C. according to ISO 6427 in the range of 0.5 to 2.0 wt %,
(b) an elastomeric propylene copolymer dispersed in said matrix,
wherein
(i) said heterophasic propylene copolymer has a melt flow rate $MFR_2$ (230° C.) measured according to ISO 1133 in the range of 25 to 200 g/10 min and
(ii) the amorphous phase (AM) of the cold soluble fraction (XCS) of the heterophasic propylene copolymer has an intrinsic viscosity measured according to ISO 1628-1 (at 135° C. in tetraline) of ≥2.0 dl/g.

It has surprisingly been found that such heterophasic propylene copolymers are featured by an excellent stiffness/impact/flowability balance, whereby the high stiffness allows to go for down-gauging, light-weighing as well as cycle time reduction and the good impact leads to a material which will perform in application testing superior to state-of-the-art heterophasic propylene copolymers (see examples).

In the following the invention is described in more detail.

A heterophasic propylene copolymer (HECO) according to this invention comprises a polypropylene (PP) as a matrix and dispersed therein an elastomeric propylene copolymer (EC). Thus the polypropylene matrix contains (finely) dispersed inclusions being not part of the matrix and said inclusions contain the elastomeric propylene copolymer (EC). The term inclusion indicates that the matrix and the inclusion form different phases within the heterophasic propylene copolymer (HECO), said inclusions are for instance visible by high resolution microscopy, like electron microscopy or scanning force microscopy.

Preferably the heterophasic propylene copolymer (HECO) according to this invention comprises as polymer components only the polypropylene and the elastomeric propylene copolymer (EC). In other words the heterophasic propylene copolymer (HECO) may contain further additives but no other polymer in an amount not exceeding 4.0 wt %, more preferably not exceeding 3.0 wt %, like not exceeding 2.0 wt %, based on the total heterophasic propylene copolymer (HECO). One additional polymer which may be present in such low amounts is a polyethylene which is a by-reaction product obtained by the preparation of heterophasic propylene copolymer (HECO) (see in detail below). Accordingly it is in particular appreciated that the instant heterophasic propylene copolymer (HECO) contains only the polypropylene matrix, the elastomeric propylene copolymer (EC) and optionally polyethylene in amounts as mentioned in this paragraph.

One aspect of the present invention is that the heterophasic propylene copolymer (HECO) is featured by a rather high melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the heterophasic propylene copolymer (HECO) has an $MFR_2$ (230° C.) of in the range of 25 to 200 g/10 min, preferably in the range of 30 to 180 g/10 min, more preferably in the range of 35 to 150 g/10 min.

Preferably it is desired that the heterophasic propylene copolymer (HECO) is thermo-mechanically stable. Accordingly it is appreciated that the heterophasic propylene copolymer (HECO) has a melting temperature of at least 160° C., more preferably of at least 162° C., still more preferably in the range of 163 to 170° C.

Additionally it is preferred that the crystallization temperature of the heterophasic propylene copolymer (HECO) is in the range of 120 to 135° C., preferably in the range of 122° C. to 132° C.

The heterophasic propylene copolymer (HECO) comprises apart from propylene also comonomers. Preferably the heterophasic propylene copolymer (HECO) comprises apart from propylene ethylene and/or $C_4$ to $C_{12}$ α-olefins. Accordingly the term "propylene copolymer" according to this invention is understood as a polypropylene comprising, preferably consisting of, units derivable from (a) propylene
and
(b) ethylene and/or $C_4$ to $C_{12}$ α-olefins.

Thus the propylene copolymers according to this invention, i.e. the heterophasic propylene copolymer (HECO) and the elastomeric propylene copolymer (EC) comprise monomers copolymerisable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymers according to this invention comprise, especially consist of, monomers copolymerisable with propylene from the group consisting of ethylene, 1-butene and 1-hexene. More specifically the propylene copolymers of this invention comprise—apart from propylene—units derivable from ethylene and/or 1-butene. In a preferred embodiment the propylene copolymers according to this invention comprise units derivable from ethylene and propylene only.

Accordingly, the elastomeric propylene copolymer (EC) is preferably an ethylene propylene rubber (EPR).

Additionally it is appreciated that the heterophasic propylene copolymer (HECO) preferably has a comonomer content in the range of 2.0 to 10.0 wt %, preferably in the range of 3.0 to 9.0 wt %, more preferably in the range of 3.5 to 7.0 wt %.

The xylene cold soluble (XCS) fraction measured according to ISO 6427 (23° C.) of the heterophasic propylene copolymer (HECO) is in the range of 5.0 to 20.0 wt %, preferably in the range of 9.0 to 18.0 wt %.

The heterophasic propylene copolymer (HECO) is in particular defined by the matrix and the elastomeric propylene copolymer (EC) dispersed therein. Accordingly both components are now defined in more detail.

The matrix is a propylene homopolymer.

The expression propylene homopolymer as used throughout the instant invention relates to a polypropylene that consists substantially, i.e. of equal or below than 99.9 wt %, of propylene units. In a preferred embodiment only propylene units in the propylene homopolymer are detectable. The comonomer content can be determined by FT infrared spectroscopy, as described below in the example section.

As stated above the heterophasic propylene copolymer (HECO) has a rather high melt flow rate. Accordingly, the same holds true for its matrix, i.e. the polypropylene. Thus the polypropylene matrix has a melt flow rate $MFR_2$ (230° C.) measured according to ISO 1133 in the range of 30 to 500 g/10 min, preferably in the range of 40 to 400 g/10 min, more preferably in the range of 50 to 100 g/10 min.

Further it is appreciated that the matrix of the heterophasic propylene copolymer (HECO) is featured by a moderately broad molecular weight distribution. Accordingly it is appreciated that the matrix of the heterophasic propylene copolymer (HECO), i.e. the polypropylene, has a molecular weight distribution (MWD) of equal or less than 12.0, preferably of equal or less than 10.0, more preferably in the range of 4.0 to 9.5, still more preferably in the range of 4.5 to 9.0.

Additionally the polypropylene (PP) can be defined by its molecular weight. Thus it appreciated that the polypropylene (PP) has a weight average molecular weight (Mw) measured by gel permeation chromatography (GPC; ISO 16014-4: 2003) of equal or less than 300 kg/mol, more preferably of equal or less than 250 kg/mol, yet more preferably in the range of 75 to 225 kg/mol, still more preferably in the range of 80 to 200 kg/mol.

In addition to the high melt flow rate, the matrix should have a xylene cold soluble fraction as low as possible.

Accordingly xylene cold soluble (XCS) content of the matrix measured according to ISO 6427 (23° C.) is in the range of 0.5 to 2.0 wt %, preferably 0.5 to 1.8 wt %.

Furthermore it is preferred that the polypropylene matrix is isotactic. Accordingly it is appreciated that the matrix has a rather high pentad concentration, i.e. higher than 95%, preferably higher than 97%.

As indicated above the polypropylene matrix comprises three propylene homopolymer fractions (PPH1), (PPH2) and (PPH3), the three propylene fractions (PPH1), (PPH2), and (PPH3) differ from each other by the melt flow rate $MFR_2$ (230° C.) measured according to ISO 1133.

The first fraction ($a_1$) is a low molecular weight propylene homopolymer (PPH1) with a rather high melt flow rate $MFR_2$ (230° C.) measured according to ISO 1133 in the range of 200 to 500 g/10 min, preferably in the range of 210 to 400 g/10 min and more preferably in the range of 220 to 350 g/10 min.

The xylene cold soluble (XCS) content measured according to ISO 6427 (23° C.) of the first polypropylene fraction (PPH1) is preferably in the range of 1.5 to 4.0 wt %, preferably in the range of 2.0 to 3.0 wt %.

The second fraction (PPH2) is either a medium molecular weight propylene homopolymer $(a_{2-1})$ or a high molecular weight propylene homopolymer $(a_{2-2})$.

The medium molecular weight propylene homopolymer $(a_{2-1})$ fraction has a melt flow rate $MFR_2$ (230° C.) measured according to ISO 1133 in the range of 30 to <200 g/10 min and preferably in the range of 40 to 180 g/10 min.

The xylene cold soluble (XCS) content measured according to ISO 6427 (23° C.) of the medium molecular weight polypropylene fraction $(a_{2-1})$ is preferably in the range of 0.8 to 4.0 wt %, preferably in the range of 1.0 to 3.0 wt %.

The high molecular weight propylene homopolymer $(a_{2-2})$ fraction has a melt flow rate $MFR_2$ (230° C.) measured according to ISO 1133 in the range of 5 to <30 g/10 min and preferably in the range of 10 to 20 g/10 min.

The xylene cold soluble (XCS) content measured according to ISO 6427 (23° C.) of the high molecular weight polypropylene fraction $(a_{2-2})$ is preferably in the range of 0.3 to 3.0 wt %, preferably in the range of 0.4 to 1.5 wt %.

If the second propylene homopolymer (PPH2) is a medium molecular weight propylene homopolymer $(a_{2-1})$, then the third propylene homopolymer (PPH3) is the highest molecular weight propylene homopolymer $(a_{3-1})$ fraction.

The highest molecular weight propylene homopolymer $(a_{3-1})$ fraction has a melt flow rate $MFR_2$ (230° C.) measured according to ISO 1133 in the range of 0.03 to 5 g/10 min and preferably in the range of 0.06 to 3.5 g/10 min.

The xylene cold soluble (XCS) content measured according to ISO 6427 (23° C.) of the highest molecular weight polypropylene fraction $(a_{3-1})$ is preferably up to 3.0 wt %, preferably up to 2.0 wt %.

If the second propylene homopolymer (PPH2) is a high molecular weight propylene homopolymer $(a_{2-2})$, then the third propylene homopolymer (PPH3) is the medium molecular weight propylene homopolymer $(a_{3-2})$ fraction.

The medium molecular weight propylene homopolymer $(a_{3-2})$ fraction has a melt flow rate $MFR_2$ (230° C.) measured according to ISO 1133 in the range of 30 to <200 g/10 min and preferably in the range of 35 to 180 g/10 min, more preferably in the range of 40 to 100 g/10 min.

The xylene cold soluble (XCS) content measured according to ISO 6427 (23° C.) of the medium molecular weight polypropylene fraction $(a_{3-2})$ is preferably in the range of 0.2 to 3.0 wt %, preferably in the range of 0.3 to 2 wt %.

Thus, in one preferred embodiment the $MFR_2$ (230° C.) decreases from the first propylene homopolymer fraction (PPH1) to the second propylene homopolymer fraction (PPH2), PPH2 being the medium molecular weight fraction $(a_{2-1})$, and from the second propylene homopolymer fraction (PPH2) to the third propylene homopolymer fraction (PPH3), PPH3 being the highest molecular weight fraction $(a_{3-1})$. Accordingly the second propylene homopolymer fraction (PPH2) has a lower melt flow rate $MFR_2$ (230° C.) than the first propylene homopolymer fraction (PPH1) but higher melt flow rate $MFR_2$ (230° C.) than the third propylene homopolymer fraction (PPH2). Thus the third propylene homopolymer fraction (PPH3) has the lowest melt flow rate $MFR_2$ (230° C.).

In another preferred embodiment the first propylene homopolymer fraction (PPH1) has the highest $MFR_2$ (230° C.), the second propylene homopolymer fraction (PPH2) has the lowest $MFR_2$ (230° C.), thus being the high molecular weight fraction $(a_{2-2})$ and the third propylene homopolymer fraction (PPH3) has a medium $MFR_2$ (230° C.) which is higher than the $MFR_2$ (230° C.) of fraction $(a_{2-2})$ but lower than the $MFR_2$ (230° C.) of the first fraction $(a_1)$, thus PPH3 being the medium molecular weight fraction $(a_{3-2})$.

Especially good results are obtainable in case the individual fractions are present in specific amounts.

Accordingly it is preferred that the amount of the first propylene homopolymer fraction (PPH1) is in the range of 25 to 60 wt %, preferably 30 to 55 wt % and more preferred in the range of 35 to 50 wt %, based on the combined amount of propylene homopolymer fractions (PPH1), (PPH2) and (PPH3).

The amount of the second propylene homopolymer fraction (PPH2) is, in case of (PPH2) being the medium molecular weight fraction $(a_{2-1})$, preferably in the range of 20 to 50 wt %, preferably 25 to 45 wt % and more preferred in the range of 30 to 40 wt %, based on the combined amount of propylene homopolymer fractions (PPH1), (PPH2) and (PPH3).

In case the second propylene homopolymer fraction (PPH2) is the high molecular weight fraction $(a_{2-2})$, the amount of (PPH2) is preferably in the range of 15 to 50 wt %, preferably 20 to 45 wt % and more preferred in the range of 25 to 40 wt %, based on the combined amount of propylene homopolymer fractions (PPH1), (PPH2) and (PPH3).

The amount of the third propylene homopolymer fraction (PPH3) is, in case of (PPH3) being the highest molecular weight fraction $(a_{3-1})$, preferably in the range of 5 to 50 wt %, preferably 8 to 40 wt % and more preferred in the range of 10 to 30 wt %, based on the combined amount of propylene homopolymer fractions (PPH1), (PPH2) and (PPH3).

In case the third propylene homopolymer fraction (PPH3) is the medium molecular weight fraction $(a_{3-2})$, the amount of (PPH3) is preferably in the range of 15 to 50 wt %, preferably 20 to 45 wt % and more preferred in the range of 25 to 40 wt %, based on the combined amount of propylene homopolymer fractions (PPH1), (PPH2) and (PPH3).

Thus very good results are achievable in case the polypropylene matrix comprises $(a_1)$ 25 to 60 wt %, preferably 30 to 55 wt % of the first propylene homopolymer (PPH1)

$(a_{2-1})$ 20 to 50 wt %, preferably 25 to 45 wt % of the second propylene homopolymer (PPH2) and $(a_{3-1})$ 5 to 50 wt %, preferably 8 to 40 wt % of the third propylene homopolymer (PPH3), based on the total amount of propylene homopolymer fractions (PPH1), (PPH2) and (PPH3) or $(a_1)$ 25 to 60 wt %, preferably 30 to 55 wt % of the first propylene homopolymer (PPH1)

$(a_{2-2})$ 15 to 50 wt %, preferably 20 to 45 wt % of the second propylene homopolymer (PPH2) and $(a_{3-2})$ 15 to 50 wt %, preferably 20 to 45 wt % of the third propylene homopolymer (PPH3), based on the total amount of propylene homopolymer fractions (PPH1), (PPH2) and (PPH3).

Preferably the polypropylene matrix is produced in a sequential polymerisation process, preferably as described in detail below. Accordingly the three polypropylene fractions (PPH1), (PPH2), and (PPH3) are an intimate mixture, which is not obtainable by mechanical blending.

A further essential component of the heterophasic propylene copolymer (HECO) is the elastomeric propylene copolymer (EC) dispersed in the matrix. The elastomeric propylene copolymer (EC) comprises monomers copolymerisable with propylene, for example comonomers such as ethylene and/or $C_4$ to $C_{12}$ α-olefins, in particular ethylene and/or $C_4$ to $C_8$ α-olefins, e.g. 1-butene and/or 1-hexene.

Preferably the elastomeric propylene copolymer (EC) comprises, especially consists of, monomers copolymerisable with propylene from the group consisting of ethylene, 1-butene and 1-hexene. More specifically the elastomeric propylene copolymer (EC) comprises—apart from propylene—units derivable from ethylene and/or 1-butene. Thus in an especially preferred embodiment the elastomeric propylene copolymer (EC) comprises units derivable from ethylene and propylene only.

The properties of the elastomeric propylene copolymer (EC) mainly influence the xylene cold soluble (XCS) content as well as the amorphous phase (AM) of the final heterophasic propylene copolymer (HECO). Thus according to the present invention the amorphous phase (AM) of the heterophasic propylene copolymer (HECO) is regarded as the elastomeric propylene copolymer (EC) of the heterophasic propylene copolymer (HECO).

Accordingly one important requirement of the present invention is that the elastomeric propylene copolymer (EC) has a moderate to high weight average molecular weight. High intrinsic viscosity (IV) values reflect a high weight average molecular weight. Thus it is appreciated that the amorphous phase (AM) of the xylene cold soluble fraction (XCS) of the heterophasic propylene copolymer (HECO) has an intrinsic viscosity (IV) measured according to ISO 1628-1 (at 135° C. in tetraline) of equal or higher than 2.0 dl/g. Preferably the intrinsic viscosity (IV) measured according to ISO 1628-1 (at 135° C. in tetraline) is in the range of 2.0 to 5.0 dl/g, more preferably in the range of 2.3 to 4.5 dl/g.

The comonomer content, preferably the ethylene content, within the elastomeric propylene copolymer (EC) is comparatively low. Accordingly in a preferred embodiment the comonomer content, more preferably ethylene content, of the amorphous phase (AM) of the xylene cold soluble fraction (XCS) of the heterophasic propylene copolymer (HECO) is in the range of 25 to 45.0 wt %, more preferably in the range of 30.0 to 42.0 wt %.

The heterophasic propylene copolymer (HECO) according to this invention preferably comprises
(a) 75.0 to 95.0 wt %, more preferably 80.0 to 94.0 wt %, of the polypropylene matrix, and
(b) 5.0 to 25.0 wt %, more preferably 6.0 to 20.0 wt %, of the elastomeric copolymer (EC), based on the total amount of the polypropylene matrix and the elastomeric copolymer (EC), wherein the amount of the elastomeric copolymer (EC) corresponds to the amount of the amorphous fraction (AM) of the xylene cold soluble (XCS) fraction.

Finally the heterophasic propylene copolymer (HECO) of the instant invention is preferably featured by
(i) a tensile modulus measured according to ISO 527-2 of at least 1600 MPa, more preferably of at least 1700 MPa, most preferably in the range from 1700 to 3000 MPa, and/or
(ii) a Charpy notched impact strength measured according to ISO 179 (1 eA; 23° C.) of at least 3.0 kJ/m$^2$, preferably of at least 3.5 kJ/m$^2$, most preferably in the range from 3.5 to 10 kJ/m$^2$ and a Charpy notched impact strength measured according to ISO 179 (1 eA; −20° C.) of at least 2 kJ/m$^2$, preferably of at least 2.5 kJ/m$^2$, most preferably in the range from 2.5 to 7 kJ/m$^2$.

The heterophasic propylene copolymer (HECO) as defined in the instant invention may contain up to 4.0 wt % additives, like nucleating agents and antioxidants, as well as slip agents and talc.

The instant invention is also directed to the use of the heterophasic propylene copolymer (HECO) for injection moulding applications, especially for thin-walled packaging.

Furthermore, the present invention relates to packing material, like injection-moulded packaging containers, like thin-walled injection mouldings, houseware articles and transport packaging, comprising at least 75 wt %, preferably comprising at least 90 wt %, and more preferably at least 95 wt %, most preferably consists of, a heterophasic propylene copolymer (HECO) as defined in the instant invention.

The heterophasic propylene copolymer (HECO) as defined above is preferably produced by a sequential polymerisation process as defined below.

Accordingly the present invention is further directed to a sequential polymerisation process for producing a heterophasic propylene copolymer according to the present invention, said heterophasic propylene copolymer comprises a polypropylene matrix and a elastomeric propylene copolymer dispersed in said matrix, wherein said process comprises the steps of polymerising propylene in a first slurry reactor obtaining as slurry reactor product the first propylene homopolymer fraction (PPH1) of the polypropylene matrix transferring the slurry reactor product into a $1^{st}$ gas phase reactor producing the second propylene homopolymer fraction (PPH2) of the polypropylene matrix in the presence of the first propylene homopolymer fraction (PPH1), obtaining as $1^{st}$ gas phase reactor product a mixture of the first propylene homopolymer fraction (PPH1) and the second propylene homopolymer fraction (PPH2), transferring said $1^{st}$ gas phase reactor product into a $2^{nd}$ gas phase reactor producing the third propylene homopolymer fraction (PPH3) of the polypropylene matrix in the presence of said $1^{st}$ gas phase reactor product in said $2^{nd}$ gas phase reactor, obtaining as $2^{nd}$ gas phase reactor product a mixture of the first propylene homopolymer fraction (PPH1), the second propylene homopolymer fraction (PPH2) and the third propylene homopolymer fraction (PPH3), being the polypropylene matrix, said first, second and third propylene homopolymer fractions (PPH1), (PPH2) and (PPH3) having different MFR$_2$ (230° C.) measured according to ISO 1133, transferring the $2^{nd}$ gas phase reactor product into a $3^{ld}$ gas phase reactor producing the elastomeric propylene copolymer in the presence of said $2^{nd}$ gas phase reactor product and at least one ethylene and/or C$_4$ to C$_{12}$ α-olefin, and recovering the heterophasic propylene copolymer for further processing.

Preferably between the first gas phase reactor and the second gas phase reactor and optionally between the second gas phase reactor and the third gas phase reactor the monomers are flashed out.

For preferred embodiments of the heterophasic propylene copolymer (HECO), the polypropylene matrix, the first propylene homopolymer fraction (PPH1), the second propylene homopolymer fraction (PPH2), and the third propylene homopolymer fraction (PPH3), as well as for the elastomeric copolymer (EC) reference is made to the definitions given above.

The term "sequential polymerisation process" indicates that the heterophasic propylene copolymer is produced in at least four reactors connected in series. Accordingly the present process comprises at least a first slurry reactor, a first gas phase reactor, a second gas phase reactor and a third gas phase reactor.

The first slurry reactor can be any continuous or simple stirred batch tank reactor or loop reactor operating in bulk or slurry. Bulk means a polymerisation in a reaction medium that comprises of at least 60% (w/w) monomer. According to the present invention the slurry reactor is preferably a (bulk) loop reactor.

The second reactor, the third reactor and the fourth reactor are gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

A preferred sequential polymerisation process is a "loop-gas phase"-process, such as developed by Borealis (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

With respect to the above-mentioned preferred slurry-gas phase process, the following general information can be provided with respect to the process conditions.

Slurry polymerisation is preferably a so called bulk polymerisation. By "bulk polymerisation" is meant a process where the polymerisation is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerisation, the inert components tend to accumulate, and thus the reaction medium may comprise up to 40 wt % of other compounds than monomer. It is to be understood, however, that such a polymerisation process is still within the meaning of "bulk polymerisation", as defined above.

The temperature in the slurry polymerisation is typically from 50 to 110° C., preferably from 60 to 100° C. and in particular from 65 to 95° C. The pressure is from 1 to 150 bar, preferably from 10 to 100 bar. In some cases it may be preferred to conduct the polymerisation at a temperature which is higher than the critical temperature of the fluid mixture constituting the reaction phase and at a pressure which is higher than the critical pressure of said fluid mixture. Such reaction conditions are often referred to as "supercritical conditions". The phrase "supercritical fluid" is used to denote a fluid or fluid mixture at a temperature and pressure exceeding the critical temperature and pressure of said fluid or fluid mixture.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in US-A-4582816, U.S. Pat. No. 3,405,109, U.S. Pat. No. 3,324,093, EP-A-479186 and U.S. Pat. No. 5,391,654.

The residence time can vary in the reactor zones identified above. In one embodiment, the residence time in the slurry reactor, for example a loop reactor, is in the range of from 0.5 to 5 hours, for example 0.5 to 2 hours, while the residence time in the gas phase reactor generally will be from 1 to 8 hours.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerisation stage other components may also be introduced as it is known in the art. Thus, hydrogen is added to control the molecular weight of the polymer. Process additives may also be introduced into the reactor to facilitate a stable operation of the process.

Since the slurry polymerisation stage is followed by gas phase polymerisation stages it is preferred to conduct the slurry directly into the gas phase polymerisation zone without a flash step between the stages. This kind of direct feed is described in EP-A-887379, EP-A-887380, EP-A-887381 and EP-A-991684.

The polymerisation in gas phase may be conducted in fluidized bed reactors, in fast fluidized bed reactors or in settled bed reactors or in any combination of these. When a combination of reactors is used then the polymer is transferred from one polymerisation reactor to another. Furthermore, a part or whole of the polymer from a polymerisation stage may be returned into a prior polymerisation stage.

Ad Fluidized Bed:

In a fluidized bed gas phase reactor an olefin is polymerised in the presence of a polymerisation catalyst in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are know by using common engineering practise. An overview is given, among others in Geldart: Gas Fluidization Technology, J. Wiley & Sons, 1986.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerisation.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerisation reactor is operated at a temperature within the range of from 50 to 100° C., preferably from 65 to 90° C. The pressure is suitably from 10 to 40 bar, preferably from 15 to 30 bar.

Ad Fast Fluidized Bed:

The polymerisation may also be conducted in a fast fluidized bed reactor. In such a reactor the velocity of the fluidization gas exceeds the onset velocity of pneumatic transport. Then the whole bed is carried by the fluidization gas. The gas transports the polymer particles to a separation device, such as cyclone, where the gas is separated from the polymer particles. The polymer is transferred to a subsequent reaction zone, such as a settled bed or a fluidized bed or another fast fluidized bed reactor. The gas, on the other hand, is compressed, cooled and recycled to the bottom of the fast fluidized bed reactor. In one such embodiment the polymer is transferred from the riser (operated in fast fluidized mode) into the downcomer (operated as settled bed, as explained below) and the fluidizing gas is then directed to compression and cooling as described above. The combination of fast fluidized bed and settled bed is disclosed, among others, in WO-A-97/04015, WO-A-2006/022736 and WO-A-2006/120187.

Typically the fluidized bed polymerisation reactor is operated at a temperature within the range of from 50 to 100° C., preferably from 65 to 90° C. The pressure is suitably from 10 to 40 bar, preferably from 15 to 30 bar.

Ad Settled Bed:

Polymerisation may also be conducted in a settled bed. In the settled bed the polymer flows downward in a plug flow manner in an environment containing reactive components in gaseous phase. The polymer powder is introduced into the bed from the top from where it flows downwards due to gravity.

The reactants, such as hydrogen, monomer and comonomers, may be introduced at any point of the reactor. However, where the gas flows upwards its velocity should not exceed the minimum fluidization velocity as otherwise no downward flow of powder would be obtained. It is also preferred to have a gas buffer at the top of the reactor so that reaction gas from previous polymerisation zones contained in the polymer powder would be removed to the extent possible.

The temperature of the settled bed may be controlled by adjusting the temperature and ratio of the reactant and/or inert gases introduced into the settled bed zone.

The settled bed polymerisation zone is preferably combined with a fluidized bed polymerisation zone or fast fluidized bed reaction zone. Thus, the polymer is introduced into the top of the settled bed zone from a fluidized bed zone or a fast fluidized bed zone. The polymer is withdrawn from the bottom of the settled bed polymerisation zone and recycled into the fluidized bed polymerisation zone or fast fluidized bed polymerisation zone.

Polymerisation in settled bed is disclosed, among others, in EP-A-1633466, EP-A-1484343 and WO-A-97/04015.

Typically the settled bed polymerisation reactor is operated at a temperature within the range of from 50 to 100° C., preferably from 65 to 90° C. The pressure is suitably from 10 to 40 bar, preferably from 15 to 30 bar.

If desired, the polymerisation may be effected in a known manner under supercritical conditions in the slurry, preferably loop reactor, and/or as a condensed mode in the gas phase reactor.

Preferably the process comprises also a prepolymerisation step.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

A small amount of comonomer (ethylene and/or a $C_4$-$C_{10}$ alpha-olefin) may be introduced. The amount of comonomer is less than 5 weight % in order to avoid the occurrence of sticky particles which are caused by the reduced crystallinity of the prepolymer in the prepolymerised catalyst particles.

According to the present invention the heterophasic propylene copolymer is obtained in a sequential polymerisation process, as described above, in the presence of a catalyst system comprising a Ziegler-Natta procatalyst.

The Ziegler-Natta procatalyst (i) used according to the present invention is typically a stereospecific, high yield Ziegler-Natta procatalyst comprising as essential component a solid transition metal component. This type of procatalysts comprise, as described in detail below, in addition to the solid transition metal (like Ti) component a cocatalyst(s) (ii) as well external donor(s) (iii) as stereoregulating agent.

The solid transition metal component preferably comprises a magnesium halide and a transition metal compound. These compounds may be supported on a particulate support, such as inorganic oxide, like silica or alumina, or, usually, the magnesium halide itself may form the solid support. Examples of such catalysts are disclosed, among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754 and WO 2004/029112.

It is also possible that solid catalysts are self supported, i.e. the catalysts are not supported on an external support, but are prepared via emulsion-solidification technology, as described for example in WO 03/000757, WO 03/000754 and WO 2004/029112.

In addition to the magnesium halide and transition metal compound the solid transition metal component usually also comprises an electron donor (internal electron donor). Suitable electron donors are, among others, esters of carboxylic acids, like phthalates, citraconates, and succinates. Also oxygen- or nitrogen-containing silicon compounds may be used. Examples of suitable compounds are shown in WO 92/19659, WO 92/19653, WO 92/19658, U.S. Pat. No. 4,347,160, U.S. Pat. No. 4,382,019, U.S. Pat. No. 4,435,550, U.S. Pat. No. 4,465,782, U.S. Pat. No. 4,473,660, U.S. Pat. No. 4,530,912 and U.S. Pat. No. 4,560,671.

Preferably the Ziegler-Natta procatalyst (i) used for the present invention is a Ziegler-Natta procatalyst, which contains a trans-esterification product of a $C_1$-$C_2$-alcohol and a phthalic ester as internal donor and which is optionally modified with a vinyl compound of formula (I) $CH_2$=CH—$CHR^1R^2$, wherein $R^1$ and $R^2$ together form a 5- or 6-membered saturated, unsaturated or aromatic ring or independently represent an alkyl group comprising 1 to 4 carbon atoms.

Such a preferred procatalyst (i) used according to the invention is prepared by a) reacting a spray crystallized or emulsion solidified adduct of $MgCl_2$ and a $C_1$-$C_2$-alcohol with $TiCl_4$ b) reacting the product of stage a) with a dialkylphthalate of formula (II)

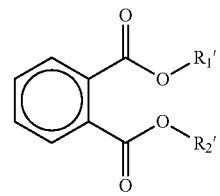

(II)

wherein $R_1'$ and $R_2'$ are independently at least a $C_5$-alkyl, under conditions where a transesterification between said $C_1$-$C_2$-alcohol and said dialkylphthalate of formula (II) takes place to form the internal donor, c) washing the product of stage b) and d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanised carrier, followed by the steps of adding to said titanised carrier (i) a dialkylphthalate of formula (II) with $R_1'$ and $R_2'$ being independently at least a $C_5$-alkyl, like at least a $C_8$-alkyl, or preferably (ii) a dialkylphthalate of formula (II) with $R_1'$ and $R_2'$ being the same and being at least a $C_5$-alkyl, like at least a $C_8$-alkyl or more preferably (iii) a dialkylphthalate of formula (II) selected from the group consisting of propylhexylphthalate (PrHP), di(ethylhexyl)phthalate (DOP), di-iso-decylphthalate (DIDP), and ditridecylphthalate (DTDP), yet more preferably the dialkylphthalate of formula (II) is di(ethylhexyl)phthalate (DOP) or di-iso-octylphthalate, in particular diethylhexylphthalate, to form a first product subjecting said first product to suitable transesterification conditions, i.e. to a temperature between 100 to 150° C., such that said methanol or ethanol is transesterified with said ester groups of said dialkylphthalate of formula (II) to form preferably at least 80 mol-%, more preferably at least 90 mol-%, most preferably at least 95 mol-%, of a dialkylphthalate of formula (III)

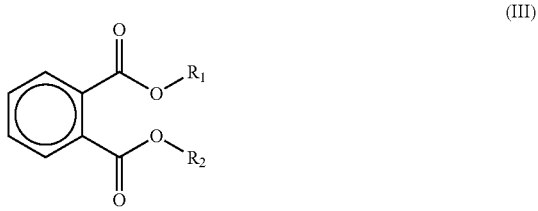
(III)

with $R_1$ and $R_2$ being methyl or ethyl, preferably ethyl, the dialkylphthalat of formula (III) being the internal donor and recovering said transesterification product as the procatalyst composition.

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

The transesterification is performed at a temperature above 100° C., advantageously between 130 to 150° C.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5% by weight of titanium at the most, preferably 2.2% by weight at the most and more preferably 2.0% by weight at the most. Its donor content is preferably between 4 to 12% by weight and more preferably between 6 and 10% by weight.

More preferably the procatalyst used according to the invention has been produced by using ethanol as the alcohol and di(ethylhexyl)phthalate (DOP) as dialkylphthalate of formula (II), yielding diethyl phthalate (DEP) as the internal donor compound.

Still more preferably the catalyst used according to the invention is a catalyst prepared according to WO92/19653 as disclosed in WO 99/24479; especially with the use of di(ethylhexyl)phthalate as dialkylphthalate of formula (II) according to WO 92/19658) or the catalyst Polytrack 8502, commercially available from Grace.

For the production of the heterophasic propylene copolymers according to the invention the catalyst system used comprises in addition to the special Ziegler-Natta procatalyst (i), as described above, a cocatalyst (ii).

As cocatalyst (ii) an organometallic compound is used.

The organometallic compound is preferably an organoaluminium compound selected from the group consisting of trialkylaluminium, like triethylaluminium (TEA), triisobutylaluminium, tri-n-butylaluminium; dialkyl aluminium chloride, like dimethyl- or diethyl aluminium chloride; and alkyl aluminium sesquichloride. More preferably the cocatalyst is triethylaluminium or diethylaluminium chloride, most preferably triethylaluminium is used as cocatalyst.

The Ziegler-Natta procatalyst suitable for producing the heterophasic propylene copolymer according to the invention is preferably modified by polymerising a vinyl compound in the presence of the special Ziegler-Natta procatalyst, the cocatalyst and an external donor, as defined below, which vinyl compound has the formula (I):

$$CH_2=CH-CHR^1R^2$$

wherein $R^1$ and $R^2$ together form a 5- or 6-membered saturated, unsaturated or aromatic ring or independently represent an alkyl group comprising 1 to 4 carbon atoms, and the modified catalyst is used for the preparation of the polymer composition. The polymerised vinyl compound can act as a nucleating agent.

Examples for suitable vinyl compounds are vinyl cycloalkanes, like vinyl cyclohexene (VCH), vinyl cyclopentane, vinyl-2-methyl cyclohexene and vinyl norbornane, 3-methyl-1-butene, styrene, p-methyl-styrene, 3-ethyl-1-hexene or mixtures thereof. VHC is preferably used for procatalyst modification.

In such a catalyst modification step the procatalyst is modified by using the vinyl compound of formula (I) in a medium, which is a liquid or a highly viscous hydrocarbon medium and which does not dissolve the polymerised polymer. Furthermore, the modification is preferably accomplished in such a way that all or practically all vinyl compound used for modification is consumed during polymerisation of the vinyl compounds. To reach that preferred aim, polymerisation is continued at elevated temperature until the concentration of the unreacted vinyl compounds in the catalyst composition after polymerisation is about 0.5 wt % or less. The modification is carried out before any conventional, usually continuous, pre-polymerisation with an olefinic monomer, to ensure that the polymerisation of the vinyl compound is complete.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerisation reaction.

Furthermore this method is also known as Borealis Nucleation Technology (BNT).

The catalysts system used comprises in addition an external donor represented by formula (IV) and/or (V)

$$Si(OCH_2CH_3)_3(NR^3R^4) \qquad (IV)$$

$$R^5nR^6mSi(OR^7)z \qquad (V)$$

wherein $R^3$ and $R^4$ can be the same or different and represent a hydrocarbon group having 1 to 12 carbon atoms and $R^5$ and $R^6$ can be the same or different and represent a hydrocarbon group having 1 to 12 carbon atoms, $R^7$ is methyl or ethyl, z is 2 or 3, preferably 2, m is 0 or 1, n is 0 or 1, with the proviso that n+m+z=4.

One suitable external donor is represented by formula (IV)

$$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. More preferably both $R^3$ and $R^4$ are the same, yet more preferably both $R^3$ and $R^4$ are an ethyl group.

Most preferably diethylaminotriethoxysilane is used as external donor of formula (IV).

A further suitable external donor is represented by formula (V) $R^5nR^6mSi(OR^7)z$,
wherein $R^5$ and $R^6$ can be the same or different and represent a hydrocarbon group having 1 to 12 carbon atoms, $R^7$ is methyl or ethyl, z is 2 or 3, preferably 2, m is 0 or 1, n is 0 or 1, with the proviso that n+m+z=4

Preferably $R^5$ and $R^6$ are independently selected from the group consisting of linear aliphatic hydrocarbon group, branched aliphatic hydrocarbon group, cyclic aliphatic hydrocarbon group and aromatic group. It is in particular preferred that $R^5$ and $R^6$ are independently selected from the group consisting of methyl, ethyl, propyl, butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

Preferred examples are diisopropyldiethoxysilane (DIPDES), cyclohexylmethyldiethoxysilane (CHMDES), dicyclopentyldimethoxysilane (DCPDMS), cyclohexylmethyldimethoxysilane (CHMDMS) and dicyclopentadienyldiethoxysilane (DCPDES). More preferably an external donor of formula (V) selected from cyclohexylmethyl-dimethoxysilane, dicyclopentyldimethoxysilane and di-iso-propyldiethoxysilane (DIPDES) is used and most preferably the dicyclopentyldimethoxysilane is used as external donor of formula (V).

The classical and traditional way to introduce the external donor to the propylene polymerisation process is to first contact the whole amount of the external donor with the cocatalyst, e.g. with triethylaluminium, and secondly to contact the first contact product of external donor and cocatalyst with the Ziegler-Natta procatalyst to yield a second contact product, which is then fed to the prepolymerisation step.

Contrary thereto—in a preferred embodiment of the process described above—only part of an external donor represented by formula (V) $R^5nR^6mSi(OR^7)z$, wherein $R^5$, $R^6$, $R^7$, n, m and z are defined as described above, preferably of dicyclopentyldimethoxysilane, is contacted with the cocatalyst, e.g. with triethylaluminium, and secondly this first contact product of external donor and cocatalyst is contacted with the Ziegler-Natta procatalyst to yield a second contact product, which is then fed to the prepolymerisation step.

The remaining part of the external donor represented by formula (V) $R^5nR^6mSi(OR^7)z$, wherein $R^5$, $R^6$, $R^7$, n, m and z are defined as described above, preferably of dicyclopentyldimethoxysilane, is fed to at least one or to several of the subsequent reactors, i.e. to one or more of the reactors selected from the slurry reactor the first, the second and the third gas phase reactor.

For example the total amount of external donor can be splitted by feeding part of the amount to the prepolymerisation reactor, the first, the second and the third gas phase reactor or by feeding part of the amount to the prepolymerisation reactor and the second gas phase reactor.

The ratio of the amount of external donor fed to the prepolymerisation reactor, the first, the second and the third gas phase reactor can vary to a great extent.

In one preferred embodiment, preferably
(a) 20 wt % to 50 wt % of the total amount of external donor are fed to the prepolymerisation reactor,
(b) 10 wt % to 40 wt % of the total amount of external donor are fed to the first gas phase reactor,
(c) 10 wt % to 30 wt % of the total amount of external donor are fed to the second gas phase reactor and
(d) 10 wt % to 30 wt % of the total amount of external donor are fed to the third gas phase reactor,
the sum of (a), (b), (c) and (d) being 100 wt %.

Furthermore the amount of external donor can be splitted between the prepolymerisation reactor and one of the gas phase reactors, preferably the second gas phase reactor, and the ratio is preferably 4:1 to 1:2.

Thus, preferably 33 wt % to 80 wt % of the total amount of the external donor are fed to the prepolymerisation reactor and 20 wt % to 67 wt % of the total amount of the external donor are fed to the gas phase reactor.

In a second preferred embodiment an external donor represented by formula (IV) $Si(OCH_2CH_3)_3(NR^3R^4)$, wherein $R^3$ and $R^4$ are defined as described above, preferably diethylaminotriethoxysilane, is fed to the prepolymerisation reactor or directly to the slurry phase reactor and an external donor represented by formula (V) $R^5nR^6mSi(OR^7)z$, wherein $R^5$, $R^6$, $R^7$, n, m and z are defined as described above, preferably dicyclopentyldimethoxysilane is fed to the first and optionally the second gas phase reactor.

The weight ratio between the external donor represented by formula (IV) and the external donor represented by formula (V) is preferably in the range of 1:3 to 3:1, more preferably in the range of 1:2 to 2:1 and most preferably about 1:1.

Thus, the amount of external donor represented by formula (IV) added to the prepolymerisation reactor or to the slurry phase reactor is preferably in the range of 25 wt % to 75 wt %, more preferably in the range of 33 wt % to 67 wt % and most preferably about 50 wt %, based on the total amount of external donor added to the whole process.

If the external donor represented by formula (V) is added to the first and the second gas phase reactor, the weight ratio added to the first and the second gas phase reactor is preferably in the range of 2:1 to 1:2, more preferably about 1:1.

With these specific ways of adding external donor in the process to produce the heterophasic propylene copolymers according to the present invention the total donor feed can be 2 to 4 times higher without losing the productivity of the catalyst.

The feed of the external donor represented by formula (V) $R^5nR^6mSi(OR^7)z$, wherein $R^5$, $R^6$, $R^7$, n, m and z are defined as described above, preferably of dicyclopentyldimethoxysilane, to the gas phase reaction steps is also a tool for molecular weight and/or isotacticity tailoring. Furthermore by adding external donor represented by formula (IV) as well as external donor represented by formula (V) to the process for producing the heterophasic propylene copolymers according to the present invention, the advantage of a high melt flow rate produced in the slurry phase reactor can be combined with good stiffness of the endproduct.

The additives as stated above are added afterwards to the heterophasic propylene copolymer (HECO), which is collected from the final reactor of the series of reactors. Preferably, these additives are mixed into the composition prior to or during the extrusion process in a one-step compounding process. Alternatively, a master batch may be formulated, wherein the heterophasic propylene copolymer (HECO) is first mixed with only some of the additives.

For mixing, a conventional compounding or blending apparatus, e.g. a Banbury mixer, a 2-roll rubber mill, Bussco-kneader or a twin screw extruder may be used. The polymer materials recovered from the extruder are usually in the form of pellets. These pellets are then preferably further processed, e.g. by injection moulding to generate articles, like packing material, of the inventive heterophasic propylene copolymer (HECO).

The heterophasic propylene copolymer (HECO) according to the invention may be pelletized and compounded using any of the variety of compounding and blending methods well known and commonly used in the resin compounding art.

In the following the present invention is further illustrated by means of examples.

EXAMPLES

A. Measuring Methods

The following definitions of terms and determination methods apply for the above general description of the invention as well as to the below examples unless otherwise defined.

Calculation of the xylene cold soluble (XCS) content of the second propylene homopolymer fraction (PPH2):

$$\frac{XS(R2) - w(PPH1) \times XS(PPH1)}{w(PPH2)} = XS(PPH2) \quad (I)$$

wherein w(PPH1) is the weight fraction of the first propylene homopolymer fraction (PPH1), i.e. the product of the first reactor (R1), being the slurry reactor, w(PPH2) is the weight fraction of the second propylene homopolymer fraction (PPH2), i.e. of the polymer produced in the second reactor (R2), being the first gas phase reactor XS(PPH1) is the xylene cold soluble (XCS) content [in wt %] as determined at 23° C. according to ISO 6427 of the first propylene homopolymer fraction (PPH1), i.e. of the product of the first reactor (R1), being the slurry reactor, XS(R2) is the xylene cold soluble (XCS) content [in wt %] as determined at 23° C. according to ISO 6427 of the product of the second reactor (R2), being the first gas phase reactor, the product being a mixture of the first propylene homopolymer fraction (PPH1) and the second propylene homopolymer fraction (PPH2)

XS(PPH2) is the calculated xylene cold soluble (XCS) content [in wt %] of the second propylene homopolymer fraction (PPH2).

Calculation of melt flow rate MFR2 (230° C.) of the second propylene homopolymer fraction (PPH2):

$$MFR(PPH2) = 10^{\left[\frac{\log(MFR(R2)) - w(PPH1) \times \log(MFR(PPH1))}{w(PPH2)}\right]} \quad (II)$$

wherein w(PPH1) is the weight fraction of the first propylene homopolymer fraction (PPH1), i.e. the product of the first reactor (R1), being the slurry reactor, w(PPH2) is the weight fraction of the second propylene homopolymer fraction (PPH2), i.e. of the polymer produced in the second reactor (R2), being the first gas phase reactor MFR(PPH1) is the melt flow rate MFR2 (230° C.) [in g/10 min] measured according ISO 1133 of the first propylene homopolymer fraction (PPH1), i.e. the product of the first reactor (R1), being the slurry reactor MFR(R2) is the melt flow rate MFR2 (230° C.) [in g/10 min] measured according ISO 1133 of the product obtained in the second reactor (R2), being the first gas phase reactor, the product being a mixture of the first propylene homopolymer fraction (PPH1) and the second propylene homopolymer fraction (PPH2), MFR(PPH2) is the calculated melt flow rate MFR2 (230° C.) [in g/10 min] of the second propylene homopolymer fraction (PPH2).

Calculation of xylene cold soluble (XCS) content of the third propylene homopolymer fraction (PPH3):

$$\frac{XS(R3) - w(R2) \times XS(R2)}{w(PPH3)} = XS(PPH3) \quad (III)$$

wherein w(R2) is the weight fraction of the second reactor (R2), being the first gas phase reactor, the product being the mixture of the first propylene homopolymer fraction (PPH1) and the second propylene homopolymer fraction (PPH2), w(PPH3) is the weight fraction of the third propylene homopolymer fraction (PPH3), i.e. of the polymer produced in the third reactor (R3), being the second gas phase reactor, XS(R2) is the xylene cold soluble (XCS) content [in wt %] as determined at 23° C. according to ISO 6427 of the product of the second reactor (R2), being the first gas phase reactor, the product being the mixture of the first propylene homopolymer fraction (PPH1) and the second propylene homopolymer fraction (PPH2), XS(R3) is the xylene cold soluble (XCS) content [in wt %] as determined at 23° C. according to ISO 6427 of the product obtained in the third reactor (R3), being the second gas phase reactor, the product being the mixture of the first propylene homopolymer fraction (PPH1), the second propylene homopolymer fraction (PPH2) and the third propylene homopolymer fraction (PPH3), XS(PPH3) is the calculated xylene cold soluble (XCS) content [in wt %] of the third propylene homopolymer fraction (PPH3).

Calculation of melt flow rate MFR2 (230° C.) of the third homopolymer fraction (PPH3):

$$MFR(PPH3) = 10^{\left[\frac{\log(MFR(R3)) - w(R2) \times \log(MFR(R2))}{w(PPH3)}\right]} \quad (IV)$$

wherein w(R2) is the weight fraction of the second reactor (R2), being the first gas phase reactor, the product being the mixture of the first propylene homopolymer fraction (PPH1) and the second propylene homopolymer fraction (PPH2), w(PPH3) is the weight fraction of the third propylene homopolymer fraction (PPH3), i.e. of the polymer produced in the third reactor (R3), being the second gas phase reactor, MFR(R2) is the melt flow rate MFR2 (230° C.) [in g/10 min] measured according ISO 1133 of the product of the second reactor (R2), being the first gas phase reactor, the product being the mixture of the first propylene homopolymer fraction (PPH1) and the second propylene homopolymer fraction (PPH2), MFR(R3) is the melt flow rate MFR2 (230° C.) [in g/10 min] measured according ISO 1133 of the product obtained in the third reactor (R3), being the second gas phase reactor, the product being the mixture of the first propylene homopolymer fraction (PPH1), the second propylene homopolymer fraction (PPH2) and the third propylene homopolymer fraction (PPH3), MFR(PPH3) is the calculated melt flow rate MFR2 (230° C.) [in g/10 min] of the third propylene homopolymer fraction (PPH3).

NMR-Spectroscopy Measurements:

The 13C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

Number average molecular weight (Mn), weight average molecular weight (Mw) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Melt Flow Rate (MFR$_2$)

The melt flow rates were measured with a load of 2.16 kg (MFR$_2$) at 230° C. The melt flow rate is that quantity of polymer in grams which the test apparatus standardized to ISO 1133 extrudes within 10 minutes at a temperature of 230° C. under a load of 2.16 kg.

Cornonomer Content

The comonomer contents of the copolymer was determined by quantitative Fourier transform infrared spectroscopy (FTIR) calibrated to results obtained from quantitative $^{13}$C NMR spectroscopy.

When measuring the ethylene content in polypropylene, a thin film of the sample (thickness about 250 mm) was prepared by hot-pressing. The area of —CH$_2$— absorption peak (800-650 cm$^{-1}$) was measured with Perkin Elmer FTIR 1600 spectrometer.

The comonomer content C was determined using a film thickness method using the intensity of the quantitative band I(q) and the thickness of the pressed film T using the following relationship: [I(q)/T]m+c=C where m and c are the coefficients determined from the calibration curve constructed using the comonomer contents obtained from $^{13}$C NMR spectroscopy.

Xylene Cold Soluble Fraction (XCS wt %)

The xylene cold soluble fraction (XCS) is determined at 23° C. according to ISO 6427.

The amorphous content (AM) is measured by separating the above xylene cold soluble fraction (XCS) and precipitating the amorphous part with acetone. The precipitate was filtered and dried in a vacuum oven at 90° C.

wherein

"AM %" is the amorphous fraction,

"m0" is initial polymer amount (g)

"m1" is weight of precipitate (g)

"v0" is initial volume (ml)

"v1" is volume of analyzed sample (ml)

Intrinsic viscosity is measured according to DIN ISO 1628/1, October 1999 (in tetraline at 135° C.).

Melting temperature Tm, crystallization temperature Tc, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Tensile Modulus is measured according to ISO 527-2 (cross head speed=50 mm/min; 23° C.) using injection moulded specimens as described in EN ISO 1873-2 (dog bone shape, 4 mm thickness).

Charpy notched impact strength is determined according to ISO 179/1 eA at 23° C. and at −20° C. by using injection moulded test specimens as described in EN ISO 1873-2 (80× 10×4 mm).

Instrumented Falling Weight (IFW) Impact and Puncture Energy are measured according to ISO 6603-2 with an impact velocity of 4.4 m/s on 60×60×2 mm$^3$ plates (lubricated) at 23° C. and −20° C.

Specimens were prepared by injection moulding according to ISO 1873-2.

B. Examples IE1 to IE5

All polymers from IE1 to IE5 were produced in a Borstar pilot plant with a prepolymerisation reactor, one slurry loop reactor and three gas phase reactors. The catalyst used in the polymerisation process was a catalyst 1.9 wt % Ti-Ziegler-Natta-catalyst prepared according to WO 92/19653 with DOP as dialkylphthalat of the formula (II) and ethanol as alcohol with triethyl-aluminium (TEA) as co-catalyst and dicyclopentyldimethoxysilane as donor in the ratios indicated in table 1.

Before the polymerisation, the catalyst was prepolymerised with vinylcyclohexane in an amount to achieve a concentration of 200 ppm poly(vinylcyclohexane) (PVCH) in the final polymer. The respective process is described in EP 1 028 984 and EP 1 183 307.

TABLE 1

Preparation of heterophasic copolymers Inventive Examples 1-5

| Parameter | Unit | IE1 | IE2 | IE3 | IE4 | IE5 |
|---|---|---|---|---|---|---|
| Prepolymerisation | | | | | | |
| temperature | [° C.] | 30 | 30 | 30 | 30 | 30 |
| Pressure | [kPa] | 5420 | 5420 | 5420 | 5420 | 5420 |

TABLE 1-continued

Preparation of heterophasic copolymers Inventive Examples 1-5

| Parameter | Unit | IE1 | IE2 | IE3 | IE4 | IE5 |
|---|---|---|---|---|---|---|
| Al/donor ratio | [mol/mol] | 15 | 15 | 15 | 15 | 15 |
| Residence time Loop | [h] | 0.2 | 0.2 | 0.2 | 0.2 | 0.2 |
| temperature | [°C.] | 80 | 80 | 80 | 80 | 80 |
| Pressure | [kPa] | 5500 | 5500 | 5500 | 5500 | 5500 |
| Residence time | [h] | 0.5 | 0.5 | 0.5 | 0.5 | 0.5 |
| $C_2$-feed | [kg/h] | 0 | 0 | 0 | 0 | 0 |
| $H_2/C_3$ ratio | [mol/kmol] | 30 | 30 | 30 | 30 | 30 |
| Donor feed | [g/t PP] | 27 | 27 | 27 | 27 | 27 |
| GPR1 | | | | | | |
| temperature | [°C.] | 80 | 80 | 80 | 80 | 80 |
| Pressure | [kPa] | 2100 | 2100 | 2100 | 2100 | 2100 |
| Residence time | [h] | 1.8 | 1.8 | 1.9 | 2.1 | 2.1 |
| $C_2$-feed | [kg/h] | 0 | 0 | 0 | 0 | 0 |
| $H_2/C_3$ ratio | [mol/kmol] | 87 | 87 | 92 | 210 | 207 |
| Donor feed | [g/h] | 4 | 4 | 4 | 0 | 0 |
| GPR2 | | | | | | |
| temperature | [°C.] | 80 | 80 | 80 | 80 | 80 |
| Pressure | [kPa] | 3200 | 3200 | 3200 | 3200 | 3200 |
| Residence time | [h] | 1.9 | 2.0 | 2.0 | 2.3 | 2.3 |
| $C_2$-feed | [kg/h] | 0 | 0 | 0 | 0 | 0 |
| $H_2/C_3$ ratio | [mol/kmol] | 110 | 110 | 114 | 10 | 10 |
| Donor feed | [g/h] | 3 | 3 | 3 | 3 | 3 |
| GPR3 | | | | | | |
| temperature | [°C.] | 80 | 80 | 80 | 80 | 80 |
| Pressure | [kPa] | 2200 | 2200 | 2200 | 2170 | 2100 |
| Residence time | [h] | 0.6 | 0.6 | 0.7 | 0.6 | 0.6 |
| $C_2$-feed | [kg/h] | 25 | 25 | 25 | 25 | 25 |
| $H_2/C_2$ ratio | [mol/kmol] | 199 | 198 | 197 | 201 | 192 |
| Donor feed | [g/h] | 3 | 3 | 3 | 3 | 3 |
| $C_2/C_3$ ratio | [mol/kmol] | 501 | 501 | 502 | 497 | 513 |

TABLE 2

Properties of the heterophasic propylene copolymers, loop, GPR1, GPR2, GPR3 of Inventive Examples 1-5

| Parameter | Unit | IE1 | IE2 | IE3 | IE4 | IE5 |
|---|---|---|---|---|---|---|
| Loop | | | | | | |
| Split | [wt %] | 35 | 33 | 34 | 43 | 43 |
| $MFR_2$ | [g/10 min] | 250 | 250 | 266 | 272 | 236 |
| XCS | [wt %] | 2.8 | 2.8 | 2.5 | 2.3 | 2.3 |
| GPR1 | | | | | | |
| Split | [wt %] | 30 | 30 | 30 | 31 | 33 |
| $MFR_2$ of PPH2 made in GPR1 | [g/10 min] | 16 | 14 | 13 | 164 | 161 |
| $MFR_2$ of GPR1 | [g/10 min] | 70 | 64 | 63 | 220 | 200 |
| XCS of PPH2 made in GPR1 | [wt %] | 0.6 | 0.7 | 0.8 | 1.1 | 1.1 |
| XCS of GPR1 | [wt %] | 1.8 | 1.8 | 1.7 | 1.8 | 1.8 |
| GPR2 | | | | | | |
| Split | [wt %] | 25 | 26 | 25 | 13 | 12 |
| $MFR_2$ of PPH3 made in GPR2 | [g/10 min] | 62 | 51 | 42 | 0.07 | 0.07 |
| $MFR_2$ of GPR2 | [g/10 min] | 68 | 60 | 56 | 65 | 65 |
| XCS of PPH3 made in GPR2 | [wt %] | 1.5 | 1.4 | 0.5 | 0.5 | 0.5 |
| XCS of GPR2 | [wt %] | 1.5 | 1.4 | 1.4 | 1.6 | 1.6 |
| Mn of matrix | [kg/mol] | n.d. | n.d. | 30 | n.d. | 30 |
| Mw of matrix | [kg/mol] | n.d. | n.d. | 151 | n.d. | 153 |
| MWD of matrix | [kg/mol] | n.d. | n.d. | 5.1 | n.d. | 5.1 |
| GPR3 | | | | | | |
| Split | [wt %] | 10 | 11 | 11 | 13 | 12 |
| $MFR_2$ of GPR3 | [g/10 min] | 43 | 41 | 39 | 41 | 42 |
| XCS of GPR3 | [wt %] | 12.8 | 11.4 | 11.8 | 15.0 | 13.5 |
| iV (AM) | [dl/g] | 2.7 | 2.5 | 2.6 | 2.5 | 2.5 |
| $C_2$ (AM) | [wt %] | 38 | 38 | 38 | 37 | 37 |
| $C_2$ of GPR3 | [wt %] | 4.3 | 4.5 | 4.4 | 5.7 | 5.1 | n.d. not determined

Examples IE6 to IE7

The polymers from IE6 and IE7 were produced in a Borstar pilot plant with a prepolymerisation reactor, one slurry loop reactor and two gas phase reactors. Only the matrix was prepared, no elastomeric propylene copolymer was produced in these examples. The catalyst used in the polymerisation process was a catalyst 1.9 wt % Ti-Ziegler-Natta-catalyst prepared according to WO 92/19653 with DOP as dialkylphthalat of the formula (II) and ethanol as alcohol with triethyl-aluminium (TEA) as co-catalyst and diethylaminotriethoxysilane (Donor 1) and dicyclopentyldimethoxysilane (Donor 2) as external donors in the ratios indicated in table 3.

Before the polymerisation, the catalyst was prepolymerised with vinylcyclohexane in an amount to achieve a concentration of 200 ppm poly(vinylcyclohexane) (PVCH) in the final polymer. The respective process is described in EP 1 028 984 and EP 1 183 307.

TABLE 3

Preparation of matrix (Inventive Examples 6 and 7)

| Parameter | Unit | IE6 | IE7 |
|---|---|---|---|
| Prepolymerisation | | | |
| temperature | [°C.] | 30 | 30 |
| Pressure | [kPa] | 5100 | 5130 |
| Donor feed | [g/h] | 0 | 0 |
| Residence time Loop | [h] | 0.3 | 0.3 |
| temperature | [°C.] | 75 | 75 |
| Pressure | [kPa] | 5420 | 5430 |
| Residence time | [h] | 0.26 | 0.26 |
| $C_2$-feed | [kg/h] | 0 | 0 |
| $H_2/C_3$ ratio | [mol/kmol] | 18.5 | 17.9 |
| Al/Donor 1 ratio | [mol/mol] | 10 | 10 |
| Donor 1 feed | [g/h] | 40 | 40 |
| GPR1 | | | |
| temperature | [°C.] | 80 | 80 |
| Pressure | [kPa] | 2500 | 2500 |
| Residence time | [h] | 1.4 | 1.5 |
| $C_2$-feed | [kg/h] | 0 | 0 |
| $H_2/C_3$ ratio | [mol/kmol] | 118 | 122 |
| Donor 2 feed | [g/h] | 4 | 4 |
| Donor 2 feed | [wt-ppm] calculated from PP production rate | 70 | 70 |
| GPR2 | | | |
| temperature | [°C.] | 90 | 90 |
| Pressure | [kPa] | 2600 | 2600 |
| Residence time | [h] | 1.1 | 1.2 |
| $C_2$-feed | [kg/h] | 0 | 0 |

TABLE 3-continued

Preparation of matrix (Inventive Examples 6 and 7)

| Parameter | Unit | IE6 | IE7 |
|---|---|---|---|
| $H_2/C_3$ ratio | [mol/kmol] | 120 | 120 |
| Donor 2 feed | [g/h] | 3 | 3 |
| Donor 2 feed | [wt-ppm] calculated from PP production rate | 40 | 40 |

TABLE 4

Properties of loop, GPR1 and GPR2 polymers of Inventive Examples 6 and 7

| Parameter | Unit | IE6 | IE7 |
|---|---|---|---|
| Loop | | | |
| Split | [wt %] | 42 | 45 |
| $MFR_2$ | [g/10 min] | 290 | 260 |
| XCS | [wt %] | 2.1 | 2.4 |
| GPR1 | | | |
| Split | [wt %] | 35 | 37 |
| $MFR_2$ of PPH2 made in GPR1 | [g/10 min] | 64 | 48 |
| $MFR_2$ of GPR1 | [g/10 min] | 145 | 121 |
| XCS of PPH2 made in GPR1 | [wt %] | 1.7 | 1.1 |
| XCS of GPR1 | [wt %] | 1.9 | 1.8 |
| GPR2 | | | |
| Split | [wt %] | 23 | 18 |
| $MFR_2$ of PPH3 made in GPR2 | [g/10 min] | 2.9 | 2.2 |
| $MFR_2$ of GPR2 | [g/10 min] | 60 | 64 |
| XCS of PPH3 made in GPR2 | [wt %] | 0.6 | 0.7 |
| XCS of GPR2 | [wt %] | 1.6 | 1.6 |
| Mn of matrix | [kg/mol] | n.d. | 19 |
| Mw of matrix | [kg/mol] | n.d. | 161 |
| MWD of matrix | [kg/mol] | n.d. | 8.5 |
| Tensile modulus | [MPa] | n.d. | 2235 |

Comparative Examples CE1 and CE2

The comparative polymers from CE1 and CE2 were produced in a Borstar pilot plant with a prepolymerisation reactor, one slurry loop reactor and three gas phase reactors. The catalyst used in the polymerisation process was a catalyst 1.9 wt % Ti-Ziegler-Natta-catalyst prepared according to WO 92/19653 with DOP as dialkylphthalat of the formula (II) and ethanol as alcohol with triethyl-aluminium (TEA) as co-catalyst and dicyclopentyldimethoxysilane as donor in the ratios indicated in table 5.

Before the polymerisation, the catalyst was prepolymerised with vinylcyclohexane in an amount to achieve a concentration of 200 ppm poly(vinylcyclohexane) (PVCH) in the final polymer. The respective process is described in EP 1 028 984 and EP 1 183 307. In the comparative examples all donor was fed via the prepolymerisation step.

TABLE 5

Preparation of comparative examples CE1 and CE2

| Parameter | Unit | CE1 | CE2 |
|---|---|---|---|
| Prepolymerisation | | | |
| temperature | [° C.] | 30 | 30 |
| Pressure | [kPa] | 5400 | 5200 |
| Al/Donor ratio | [mol/mol] | 15 | 14 |
| Residence time | [h] | 0.3 | 0.3 |
| Loop | | | |
| temperature | [° C.] | 75 | 75 |
| Pressure | [kPa] | 5700 | 5500 |
| Residence time | [h] | 0.3 | 0.3 |
| $C_2$-feed | [kg/h] | 0 | 0 |
| $H_2/C_3$ ratio | [mol/kmol] | 30 | 25 |
| GPR1 | | | |
| temperature | [° C.] | 80 | 80 |
| Pressure | [kPa] | 2100 | 2000 |
| Residence time | [h] | 1.8 | 3.0 |
| $C_2$-feed | [kg/h] | 0 | 0.2 |
| $H_2/C_3$ ratio | [mol/kmol] | 90 | 180 |
| GPR2 | | | |
| temperature | [° C.] | 85 | 90 |
| Pressure | [kPa] | 3200 | 2900 |
| Residence time | [h] | 2.1 | 2.3 |
| $C_2$-feed | [kg/h] | 0.1 | 0.1 |
| $H_2/C_3$ ratio | [mol/kmol] | 110 | 30 |
| GPR3 | | | |
| temperature | [° C.] | 80 | 80 |
| Pressure | [kPa] | 2200 | 2600 |
| Residence time | [h] | 0.7 | 0.9 |
| $C_2$-feed | [kg/h] | 25 | 25 |
| $H_2/C_2$ ratio | [mol/kmol] | 200 | 90 |
| $C_2/C_3$ ratio | [mol/kmol] | 500 | 500 |

TABLE 6

Properties of heterophasic copolymers, loop, GPR1, GPR2, GPR3 of Comparative Examples CE1 and CE2

| Parameter | Unit | CE1 | CE2 |
|---|---|---|---|
| Loop | | | |
| Split | [wt %] | 39 | 36 |
| $MFR_2$ | | 256 | 234 |
| XCS | [wt %] | 2.5 | 2.2 |
| Mw | [kg/mol] | 90 | 92 |
| GPR1 | | | |
| Split | [wt %] | 32 | 31 |
| $MFR_2$ of PPH2 made in GPR1 | [g/10 min] | 13 | 151 |
| $MFR_2$ of GPR1 | [g/10 min] | 67 | 190 |
| XCS of PPH2 made in GPR1 | [wt %] | 1.4 | 1.1 |
| XCS of GPR1 | [wt %] | 2.0 | 1.7 |
| GPR2 | | | |
| Split | [wt %] | 18 | 25 |
| $MFR_2$ of PPH3 made in GPR2 | [g/10 min] | 61 | 5 |
| $MFR_2$ of GPR2 | [g/10 min] | 66 | 74 |
| XCS of PPH3 made in GPR2 | [wt %] | 1.5 | 1.7 |
| XCS of GPR2 | [wt %] | 1.9 | 1.7 |
| Mn of matrix | [kg/mol] | 29 | 26 |
| Mw of matrix | [kg/mol] | 140 | 145 |
| MWD of matrix | [kg/mol] | 4.9 | 5.6 |

TABLE 6-continued

Properties of heterophasic copolymers, loop, GPR1, GPR2, GPR3 of Comparative Examples CE1 and CE2

| Parameter | Unit | CE1 | CE2 |
|---|---|---|---|
| GPR3 | | | |
| Split | [wt %] | 11 | 8 |
| MFR$_2$ of GPR3 | [g/10 min] | 46 | 43 |
| XCS of GPR3 | [wt %] | 13.3 | 13.0 |
| XCS made in GPR3 | [wt %] | 11.4 | 11.3 |
| iV (AM) | [dl/g] | 2.5 | 3.1 |
| C$_2$ (AM) | [wt %] | 40 | 36 |
| C$_2$ of GPR3 | [wt %] | 5 | 5 |

TABLE 7

Properties of heterophasic propylene copolymers of inventive examples IE3 and IE5 and comparative examples CE1 and CE2

| Property | Unit | IE3 | IE5 | CE1 | CE2 |
|---|---|---|---|---|---|
| Tensile modulus | [MPa] | 1820 | 1800 | 1750 | 1750 |
| Tm | [° C.] | 166 | 166 | 166 | 167 |
| Tc | [° C.] | 127 | 127 | 127 | 126 |
| NIS (23° C.) | [kJ/m$^2$] | 4.2 | 3.9 | 4.5 | 5.0 |
| NIS (−20° C.) | [kJ/m$^2$] | 3.0 | 3.0 | 3.0 | 3.0 |
| IFW (23° C.) Max. Force | [N] | 2580 | 2520 | 2510 | 2455 |
| Puncture energy (23° C.) | [J] | 25 | 17 | 21 | 15 |
| IFW (−20° C.) Max. Force | [N] | 2830 | 2830 | 2720 | 2560 |
| Puncture energy (−20° C.) | [J] | 10 | 10 | 9 | 8 |

We claim:

1. A heterophasic propylene copolymer (HECO) comprising
   (a) a polypropylene matrix comprising
      ($a_1$) a first propylene homopolymer fraction (PPH1) with a melt flow rate MFR$_2$ (230° C.) measured according to ISO 1133 in the range of 200 to 500 g/10 min
      ($a_{2-1}$) a second propylene homopolymer fraction (PPH2) with a melt flow rate MFR$_2$ (230° C.) measured according to ISO 1133 in the range of 30 to <200 g/10 min or
      ($a_{2-2}$) a second propylene homopolymer fraction (PPH2) with a melt flow rate MFR$_2$ (230° C.) measured according to ISO 1133 in the range of 5 to <30 g/10 min and
      ($a_{3-1}$) a third propylene homopolymer fraction (PPH3) with a melt flow rate MFR$_2$ (230° C.) measured according to ISO 1133 in the range of 0.03 to 5 g/10 min, if the second propylene homopolymer fraction is fraction ($a_{2-1}$) or
      ($a_{3-2}$) a third propylene homopolymer fraction (PPH3) with a melt flow rate MFR$_2$ (230° C.) measured according to ISO 1133 in the range of 30 to <200 g/10 min, if the second propylene homopolymer fraction is fraction ($a_{2-2}$),
   wherein the polypropylene matrix has a melt flow rate MFR$_2$ (230° C.) measured according to ISO 1133 in the range of 30 to 500 g/10 min and a xylene cold soluble fraction determined at 23° C. according to ISO 6427 in the range of 0.5 to 2.0 wt %
   (b) an elastomeric propylene copolymer dispersed in said matrix,
wherein
   (i) said heterophasic propylene copolymer has a melt flow rate MFR$_2$ (230° C.) measured according to ISO 1133 in the range of 25 to 200 g/10 min and
   (ii) the amorphous phase (AM) of the cold soluble fraction (XCS) of the heterophasic propylene copolymer has an intrinsic viscosity measured according to ISO 1628-1 (at 135° C. in tetraline) of ≥2.0 dl/g.

2. Heterophasic propylene copolymer (HECO) according to claim 1 wherein the polypropylene matrix comprises
   ($a_1$) as the first propylene homopolymer fraction (PPH1),
   ($a_{2-1}$) as the second propylene homopolymer fraction (PPH2) and
   ($a_{3-1}$) as the third propylene homopolymer fraction (PPH3).

3. Heterophasic propylene copolymer (HECO) according to claim 1 wherein the polypropylene matrix comprises
   ($a_1$) as the first propylene homopolymer fraction (PPH1),
   ($a_{2-2}$) as the second propylene homopolymer fraction (PPH2) and
   ($a_{3-2}$) as the third propylene homopolymer fraction (PPH3).

4. Heterophasic propylene copolymer (HECO) according to claim 1, wherein the polypropylene matrix comprises
   ($a_1$) 25 to 60 wt % of the first propylene homopolymer (PPH1)
   ($a_{2-1}$) 20 to 50 wt % of the second propylene homopolymer (PPH2) and
   ($a_{3-1}$) 5 to 50 wt % of the third propylene homopolymer (PPH3),
   based on the total amount of propylene homopolymer fractions (PPH1), (PPH2) and (PPH3) or
   ($a_1$) 25 to 60 wt % of the first propylene homopolymer (PPH1)
   ($a_{2-2}$) 15 to 50 wt % of the second propylene homopolymer (PPH2) and
   ($a_{3-2}$) 15 to 50 wt % of the third propylene homopolymer (PPH3),
   based on the total amount of propylene homopolymer fractions (PPH1), (PPH2) and (PPH3).

5. Heterophasic propylene copolymer (HECO) according to claim 1, wherein the heterophasic propylene copolymer (HECO) comprises
   (a) 75.0 to 95.0 wt % of the polypropylene matrix, and (b) 5.0 to 25.0 wt % of the elastomeric copolymer (EC), based on the total amount of the polypropylene matrix and the elastomeric copolymer (EC), wherein the amount of the elastomeric copolymer (EC) corresponds to the amount of the amorphous fraction (AM) of the xylene cold soluble (XCS) fraction.

6. Heterophasic propylene copolymer (HECO) according to claim 1, wherein the heterophasic propylene copolymer (HECO) has
   (i) a tensile modulus measured according to ISO 527-2 in the range from 1700 to 3000 MPa,
   and/or
   (ii) a Charpy notched impact strength measured according to ISO 179 (1 eA; 23° C.) in the range from 3.5 to 10 kJ/m$^2$ and a Charpy notched impact strength measured according to ISO 179 (1 eA; −20° C.) in the range from 2.5 to 7 kJ/m$^2$.

7. Heterophasic propylene copolymer (HECO) according to claim 1, wherein the polypropylene matrix comprises
   ($a_1$) 30 to 55 wt % of the first propylene homopolymer (PPH1)
   ($a_{2-1}$) 25 to 45 wt % of the second propylene homopolymer (PPH2) and ($a_{3-1}$) 8 to 40 wt % of the third propylene homopolymer (PPH3), based on the total amount of propylene homopolymer fractions (PPH1), (PPH2) and (PPH3) or ($a_1$) 30 to 55 wt % of the first propylene homopolymer (PPH1)

($a_{2-2}$) 20 to 45 wt % of the second propylene homopolymer (PPH2) and ($a_{3-2}$) 20 to 45 wt % of the third propylene homopolymer (PPH3), based on the total amount of propylene homopolymer fractions (PPH1), (PPH2) and (PPH3).

8. Heterophasic propylene copolymer (HECO) according to claim 1, wherein the heterophasic propylene copolymer (HECO) comprises (a) 80.0 to 94.0 wt %, of the polypropylene matrix, and (b) 6.0 to 20.0 wt %, of the elastomeric copolymer (EC), based on the total amount of the polypropylene matrix and the elastomeric copolymer (EC), wherein the amount of the elastomeric copolymer (EC) corresponds to the amount of the amorphous fraction (AM) of the xylene cold soluble (XCS) fraction.

* * * * *